Dec. 26, 1961  G. D. SCHOTT ETAL  3,014,648
MORTAR LOCATING COMPUTER

Filed May 24, 1951  5 Sheets-Sheet 1

INVENTORS
GENE D. SCHOTT,
ROBERT L. SCHLECHTER,

BY *Martin E. Hogan Jr.*
ATTORNEY

Dec. 26, 1961  G. D. SCHOTT ETAL  3,014,648
MORTAR LOCATING COMPUTER
Filed May 24, 1951  5 Sheets-Sheet 2

INVENTORS
GENE D. SCHOTT,
ROBERT L. SCHLECHTER,
BY
ATTORNEY

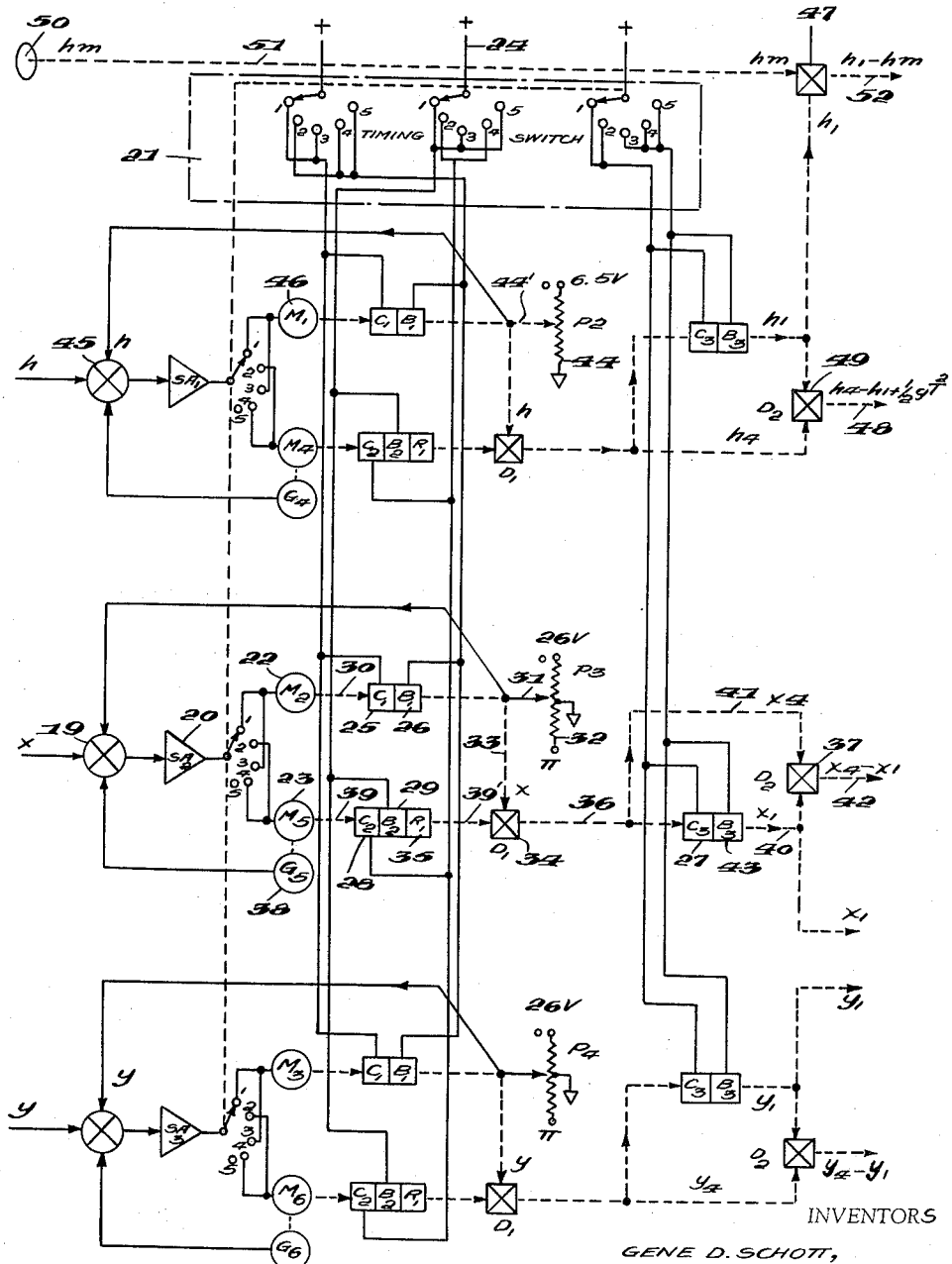
*Fig. 4a.*
INVENTORS
GENE D. SCHOTT,
ROBERT L. SCHLECHTER,
BY
ATTORNEY

Fig. 4B.

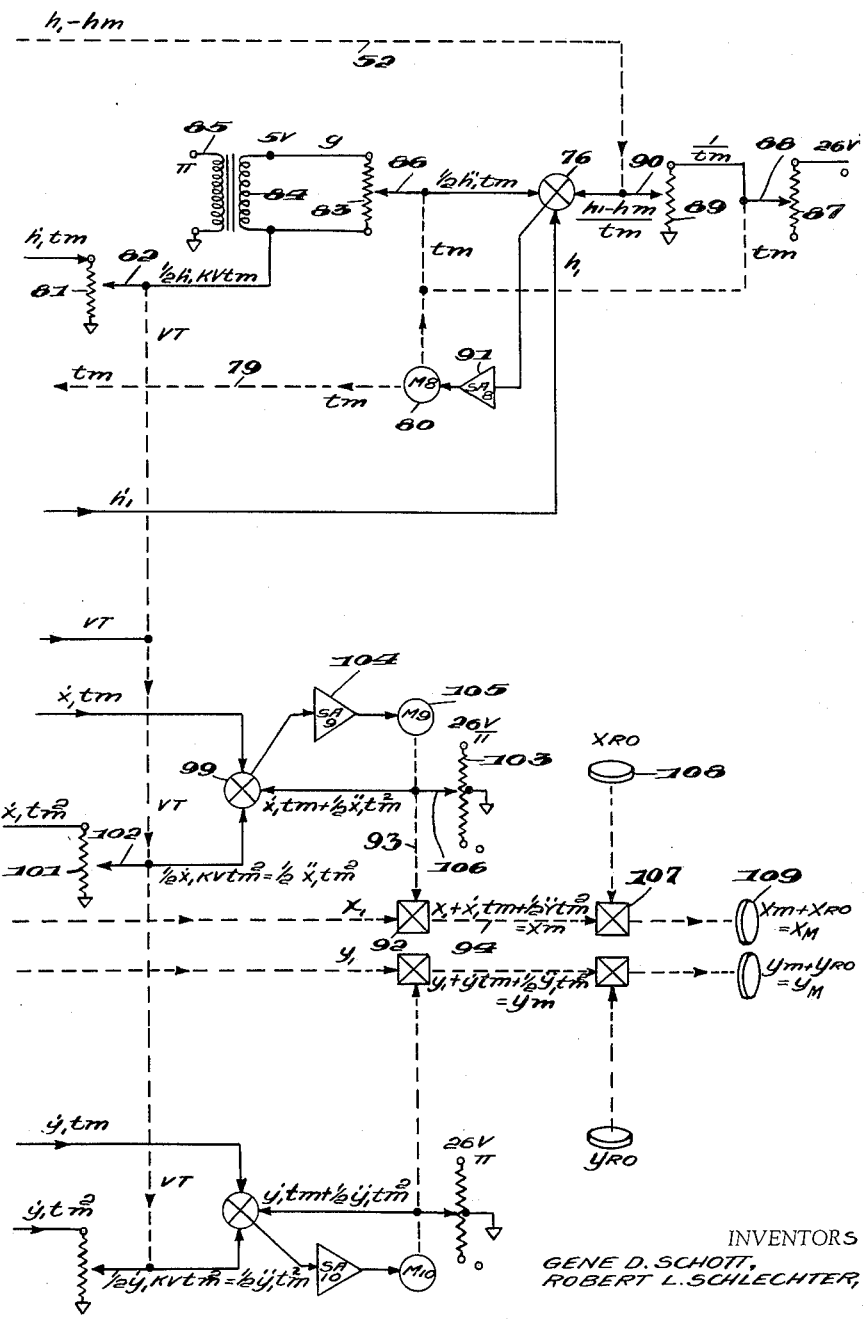

United States Patent Office 3,014,648
Patented Dec. 26, 1961

3,014,648
MORTAR LOCATING COMPUTER
Gene D. Schott and Robert L. Schlechter, Baltimore, Md., assignors to Martin-Marietta Corporation, a corporation of Maryland
Filed May 24, 1951, Ser. No. 227,948
9 Claims. (Cl. 235—61.5)

This invention relates in general to analogue type electro-mechanical computers and more particularly to a mortar locating computer adapted to operate on data obtained by radar tracking of the mortar shells to automatically compute coordinate information representing the location of the mortar.

It is an object of this invention to provide an automatic mortar locating computer which is capable of quickly and accurately locating a mortar so that counter fire can be immediately directed and brought to bear upon it.

Another object of this invention is to provide a mortar locating computer which is completely contained in a small and compact package so as to be readily portable.

Still another object of this invention is to provide a mortar locating computer having means for automatically smoothing radar input data so as to enable accurate determination of mortar shell trajectories.

Further and other objects will become apparent from the accompanying description and drawings which form a part of this disclosure and in which like numerals refer to like parts.

Figure 4B:
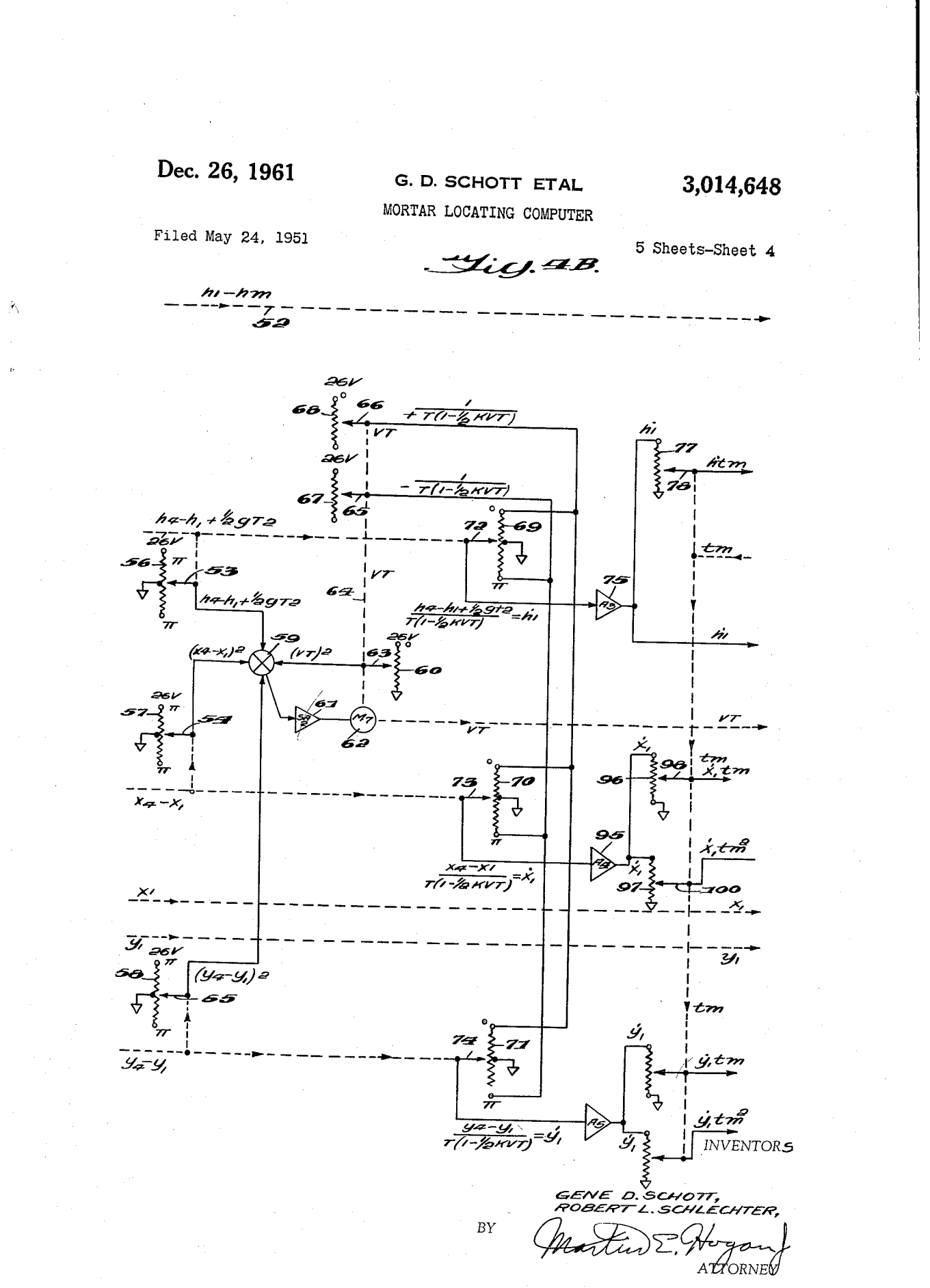

FIGURES 4A, 4B and 4C together constitute an electromechanical schematic diagram of the mortar locating computer.

Figure 5:
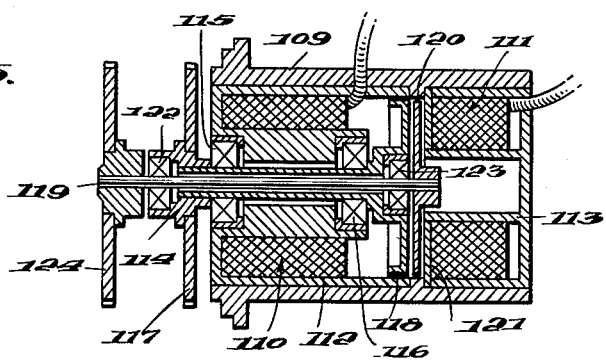

FIGURE 5 is a sectional side view of one of the clutch brake units employed in the computer.

Figure 6:
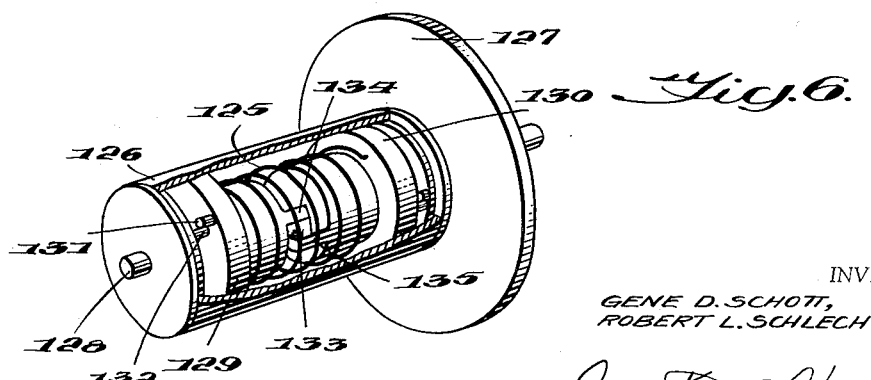

FIGURE 6 is a fragmentary perspective view of the reset unit employed in the computer.

Figure 1:
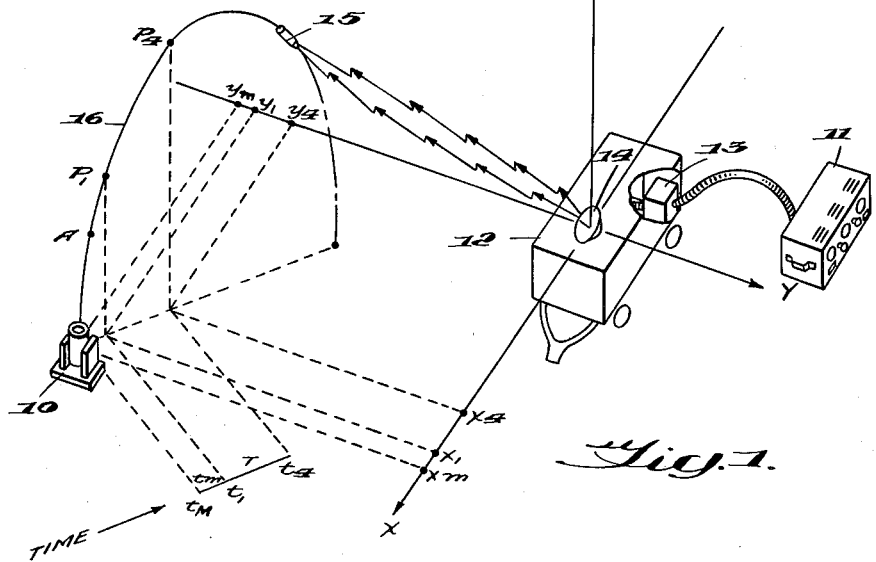
FIGURE 1 shows schematically the mortar locating computer of this invention in electrical communication with a radar unit tracking a mortar shell in a space arrangement adapted to illustrate the derivation of the computer solution.

The computer solution is based on the three equations of motion which give mortar location in terms of position, velocity and acceleration of the shell at a particular time, $t_1$ and position, $P_1$ after firing as shown in FIGURE 1. These equations in rectangular coordinates are:

$$x_m = x_1 + \dot{x}_1 t_m + \tfrac{1}{2} \ddot{x}_1 t_m^2 \qquad (1)$$
$$y_m = y_1 + \dot{y}_1 t_m + \tfrac{1}{2} \ddot{y}_1 t_m^2 \qquad (2)$$
$$h_m = h_1 + \dot{h}_1 t_m + \tfrac{1}{2} \ddot{h}_1 t_m^2 \qquad (3)$$

where $x_m$, $y_m$ and $h_m$ are coordinates of the mortar position, $x_1$, $y_1$ and $h_1$ are coordinates of the shell position at point $P_1$ on its trajectory, $\dot{x}_1$, $\dot{y}_1$ and $\dot{h}_1$ and $\ddot{x}_1$, $\ddot{y}_1$ and $\ddot{h}_1$ are coordinate velocities and accelerations respectively of the shell at point $P_1$, and $t_m$ is the time required for the shell to reach point $P_1$ from the mortar.

Computer 11 receives shell position data from radar unit 12 through an axis converter 13 of conventional design which converts the radar output data from the polar coordinate system to the rectangular coordinate system. Rectangular coordinate position data is available to the computer throughout the tracking function starting when the radar beam from scanner 14 acquires shell 15 at point A on its trajectory 16 and ending after the necessary position coordinates at points $P_1$ and $P_4$ have been memorized as hereinafter described. By having points $P_1$ and $P_4$ separated by a predetermined and accurately measured time interval T, the velocity of shell 15 can be very closely determined at $P_1$ by the following equations which are based on the assumption that gravity is the only force acting on the shell during flight.

$$\dot{x}_1 = \frac{x_4 - x_1}{T} \qquad (4)$$

$$\dot{y}_1 = \frac{y_4 - y_1}{T} \qquad (5)$$

$$\dot{h}_1 = \frac{h_4 - h_1 + \tfrac{1}{2} g T^2}{T} \qquad (6)$$

where $g$ is the acceleration of gravity.

Since the shell trajectory will be affected by air drag, deceleration terms must be included in the mortar location Equations 1, 2 and 3. From a study of trajectory data of various mortar shells, the decelartion ($a$) along the trajectory due to air drag was found to closely approximate $KV^2$ where $V$=shell velocity and $K = 1.575 \times 10^{-4}$.

Figure 2:
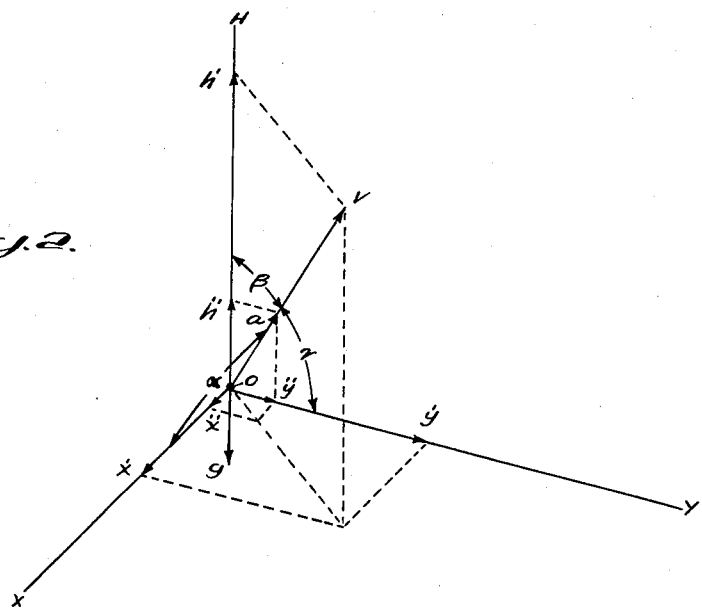
FIGURE 2 shows the relationship between the shell velocity and acceleration components.

From FIGURE 2 it may be seen that at any shell position the coordinate velocities are $$\dot{x} = V \cos \alpha,\ \dot{y} = V \cos \gamma,\ \text{and}\ \dot{h} = V \cos \beta \qquad (7)$$

and the coordinate accelerations are $$\ddot{x} = a \cos \alpha,\ \ddot{y} = a \cos \gamma,\ \text{and}\ \ddot{h} = a \cos \beta - g \qquad (8)$$

where the point 0 in FIGURE 2 is an instantaneous shell position and the lines OV and Oa represent resultant velocity and acceleration vectors respectively of the shell at that instantaneous position.

Substituting the deceleration due to air drag, $-KV^2$ for the acceleration term, $a$, in Equation 8 and then substituting from Equation 7

$$\ddot{x} = -KV^2 \cos \alpha = -KV\dot{x} \qquad (9)$$
$$\ddot{y} = -KV^2 \cos \gamma = -KV\dot{y} \qquad (10)$$
$$\ddot{h} = -KV^2 \cos \beta - g = -KV\dot{h} - g \qquad (11)$$

These equations represent the acceleration terms in Equations 1, 2 and 3.

With the addition of a slow-down correction, Equations 4, 5 and 6 for the $x$, $y$ and $h$ coordinate velocities at memory point 1 become $$\dot{x}_1 = \frac{x_4 - x_1}{T} - \tfrac{1}{2} \ddot{x}_1 T \qquad (12)$$

$$\dot{y}_1 = \frac{y_4 - y_1}{T} - \tfrac{1}{2} \ddot{y}_1 T \qquad (13)$$

$$\dot{h}_1 = \frac{h_4 - h_1}{T} - \tfrac{1}{2} \ddot{h}_1 T \qquad (14)$$

where one-half the coordinate acceleration times the time interval T between $P_1$ and $P_4$ represents the average deceleration times the time, or the velocity change due to both drag and gravity.

Substituting the values of $\ddot{x}$, $\ddot{y}_1$ and $\ddot{h}$, from Equations 9, 10 and 11 in Equations 12, 13 and 14 and simplifying, these become $$\dot{x}_1 = \frac{x_4 - x_1}{T\left(1 - \tfrac{1}{2} KVT\right)} \qquad (15)$$

$$\dot{y}_1 = \frac{y_4 - y_1}{T\left(1 - \tfrac{1}{2} KVT\right)} \qquad (16)$$

$$h_1 = \frac{h_4 - h_1 + \frac{1}{2}gT^2}{T\left(1 - \frac{1}{2}KVT\right)} \quad (17)$$

which represent the coordinate velocities in Equations 1, 2 and 3 corrected for the effects of both gravity and air drag.

In order to use Equations 15, 16 and 17 it is necessary to know $VT$. From FIGURE 2 it can be readily seen that $$V^2 = \dot{x}^2 + \dot{y}^2 + \dot{h}^2 \quad (18)$$

and substituting the memory point values of Equations 4, 5 and 6 in Equation 18 as a close approximation, $$(VT)^2 = (x_4 - x_1)^2 + (y_4 - y_1)^2 + (h_4 - h_1 + \tfrac{1}{2}gT^2)^2 \quad (19)$$

Figure 3:
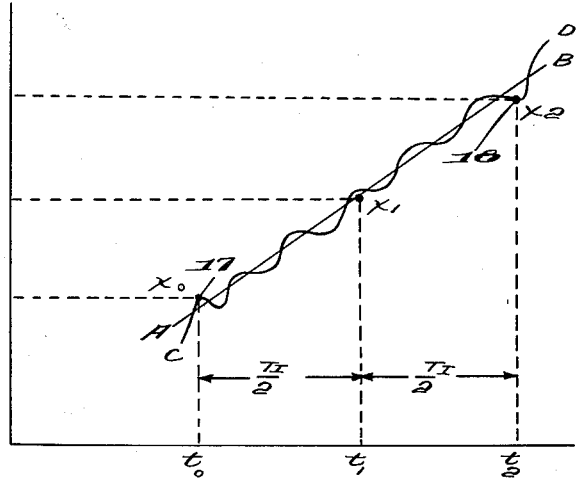
FIGURE 3 illustrates the theory of integration smoothing of radar data.

The position data from the radar, as shown by line CD in FIGURE 3, contains perturbations due to tracking errors which may considerably reduce the accuracy of the computer. If the points $P_1$ and $P_4$ at which the data is memorized should occur at peaks of perturbations as at 17 or 18, they would obviously not represent points on the actual shell trajectory. This possibility for error is eliminated in the computer by integrating the data over predetermined periods of time of which $t_1$ and $t_4$ in FIGURE 1 are the midpoints. FIGURE 3 illustrates this effect with respect to the $x$ coordinate at $t_1$. The straight line AB represents the average line through the curved line CD obtained from the radar. This line AB then represents a small portion of the actual shell trajectory shown in FIGURE 1. $t_0$ to $t_1$ and $t_1$ to $t_2$ are equal increments of time with their sum equal to the integrating time $T_I$. Since AB is the averaged line passing through the curved line CD, the area from $t_0$ to $t_2$ under the curved line, CD will equal the area from $t_0$ to $t_2$ under the line AB. Setting the equations for the area under AB and CD between $t_0$ and $t_2$ equal to each other results in $$x_1 T_I = \int_{t_0}^{t_2}(x - x_0)dt + x_0 T_I$$

or $$x_1 = \frac{1}{T_I}\int_{t_0}^{t_2}(x - x_0)dt + x_0 \quad (20)$$

Thus integration provides $x_1$ data which has been smoothed with regard to radar perturbations. In a similar manner $$x_4 = \frac{1}{T_I}\int_{t_3}^{t_5}(x - x_3)dt + x_3 \quad (21)$$

$$y_1 = \frac{1}{T_I}\int_{t_0}^{t_2}(y - y_0)dt + y_0 \quad (22)$$

$$y_4 = \frac{1}{T_I}\int_{t_3}^{t_5}(y - y_3)dt + y_3 \quad (23)$$

In the solution for $h_1$ and $h_4$ a correction must be added due to the fact that the $h$ coordinate of the actual shell trajectory follows a parabolic curve instead of a straight line as do the $x$ and $y$ coordinates, because of the pull of gravity. This correction can readily be shown to equal $\frac{1}{24}gT_I^2$, where the $\frac{1}{24}gT_I^2$ term represents the distance between the line AB and the parabolic coordinate curve at $$\frac{T_I}{2}$$

Therefore $$h_1 = \frac{1}{T_I}\int_{t_0}^{t_2}(h - h_0)dt + \frac{1}{24}gT_I^2 + h_0 \quad (24)$$

$$h_4 = \frac{1}{T_I}\int_{t_3}^{t_5}(h - h_3)dt + \frac{1}{24}gT_I^2 + h_3 \quad (25)$$

The foregoing mathematical equations are mechanized in the computer as shown in FIGURES 4A, 4B and 4C to produce $x$ and $y$ coordinates representing relative target location. Essentially the computer is divided into three channels, the $h$ channel, the $x$ channel and the $y$ channel which operate on the converted radar input data in two steps or modes. In the first mode, coordinate position values representing points $P_1$ and $P_4$ on the shell trajectory 16 are obtained and memorized in accordance with Equations 20 through 25. In the second mode these memorized values are operated on to determine the final solution in accordance with Equations 1 through 19.

The $x$ and $y$ channels are similar in both construction and operation, therefore a description of the $x$ channel will serve as a description of the $y$ channel. The $h$ channel differs somewhat from the $x$ and $y$ channels in the computer section which performs mode two, however the arrangement for performing mode one is substantially similar. To keep the description as clear and concise as possible, the $x$ channel shall be described for mode one and then the differences between the $h$ and the $x$ and $y$ channels in that portion of the computer will be pointed out. In the description of mode two, the $h$ channel will be dealt with separately.

The $x$ coordinate of the converted radar input data to the computer is fed in the form of an A.C. voltage (with an amplitude proportional to $x$) to an electrical differential 19. The output from this differential 19 is fed into a high gain servo amplifier 20. An accurate timing switch 21 completes a circuit between amplifier 20 and servo-motor 22 or 23 selectively in accordance with a predetermined time sequence. A voltage for actuating a plurality of clutches and brakes in the mode one portion of the computer in accordance with the timing sequence mentioned is applied through timing switch 21 by means of electrical leads 24. The clutches when energized, lock the input and the output shafts together and the brakes when energized hold the input shaft and free the other. The detail construction of the clutches and brakes is hereinafter described. During the initial period of operation of the computer (called the first slewing period) the points of switch 21 are at position 1, servo-amplifier 20 is electrically connected with servomotor 22. Clutch 25 is energized and brake 26 is deenergized. Clutch 27 is energized and clutch 28 and brake 29 are de-energized. The voltage supplied to motor 22 through servo amplifier 20 causes shaft 30 of motor 22 to drive wiper 31 on potentiometer 32 through shaft 33 (made rotationally rigid with shaft 30 by energizing clutch 25) in a direction such that a voltage will be applied to electrical differential 19 tending to balance the $x$ coordinate voltage supplied by the radar unit. By having potentiometer 32 center tapped to ground and then applying voltages of opposite phase to each end thereof both positive and negative values of the converted radar input data can be balanced by a voltage supplied from potentiometer 32, where the positive and negative values represent different quadrants in the coordinate system shown in FIGURE 1. Shaft 33 also provides one input to a mechanical differential 34. The rotational position of shaft 33, since motor 22 is caused to follow the radar input data by means of potentiometer 32, is proportional to the $x$ coordinate from the radar unit at any given time during the initial slewing period. Servo-motor 23 during this period is disconnected from servo amplifier 20, and clutch 28 and brake 29 are deenergized. Therefore shaft 39' which provides the second input to differential 34 remains in zero position as urged by reset spring 35 described in detail later on. The position of output shaft 36 from differential 34 therefore is proportional to the position of shaft 33 which represents the instantaneous $x$ coordinate of the converted radar data. Since clutch 27 is energized, shaft 36 causes the two shaft inputs 40 and 41 of mechanical differential 37 to rotate equal amounts and in opposite directions. The gearing arrangement of differential 37 is such that when the inputs 40 and 41 turn equal amounts and in opposite directions, no output at shaft 42 results. This first slewing period, when motor 22 is producing a shaft rotation proportional to the instantaneous $x$ coordinate, lasts for two and one-half seconds to allow the servos to settle down and accurately follow the converted radar inputs.

At the end of this 2½ second slewing period, timing switch 21 automatically moves to position 2 connecting amplifier 20 with motor 23 and disconnecting motor 22. Brake 26 is immediately energized to lock shaft 33 and potentiometer 32 in position representing the value $x_0$ shown in FIGURE 3. At the same time, clutch 25 is deenergized and clutch 28 is energized. The output from electrical differential 19 is amplified in amplifier 20 and caused to drive motor 23 with a velocity such that the output of rate generator 38 driven by motor 23 almost balances the $x-x_0$ voltage in differential 19, where the $x$ voltage is the instantaneous input from the radar unit and $x_0$ is the voltage supplied by potentiometer 32 at the end of the first slewing period. By the use of rate generator 38 in cooperation with the high gain servo amplifier 20, motor 23 is made highly sensitive to changes in the radar input data and relatively insensitive to frictional forces and torque loads applied to its shaft 39 by reset spring 35. The instantaneous position of shaft 39 represents a summation or integration of $x-x_0$ with respect to time. This integration process is continued for a period of four seconds at the end of which the shaft position represents the integral of $(x-x_0)dt$ from $t_0$ to $t_2$. Since clutch 28 is energized, this shaft rotation is fed into mechanical differential 34 and added to the shaft position representing $x_0$. In calculating the scale factor conversion between servo motor 23 and mechanical differential 34 the constant $$\frac{1}{T_I}$$

term appearing in Equation 20 is introduced. Thus the actual shaft rotation input to differential 34 is $$\frac{1}{T_I}\int_{t_0}^{t_2}(x-x_0)dt$$

$x_0$ was locked in differential 34 at the start of the integration period, yielding at the end of the integration period an output shaft position from the differential representing a solution to Equation 20 which is equal to $x_1$, a coordinate of point P, on the shell trajectory shown in FIGURE 1. Since clutch 27 is energized, the shaft output from differential 34 is fed into differential 37 through both shafts 40 and 41, but as stated previously the gearing arrangement of this differential is such that the output shaft 42 remains stationary under this condition although both input shafts will be moved to positions corresponding to $x_1$. Reset spring 35 during this integration period is wound up for use in the following time sequence.

Following the four-second integration period at position 2, timing switch 21 automatically switches to position 3 to start another slewing period lasting two seconds. Brake 43 is energized holding the $x_1$ value in shaft 40 and clutch 27 is deenergized releasing shaft 36. Clutch 28 is released allowing reset spring 35 to unwind and return input shaft 39' to zero. Brake 26 is deenergized and clutch 25 is energized connecting shaft 30 of motor 22 with shaft 33. The output of servo amplifier 20 is switched to motor 22. The $x$ coordinate data from the radar unit again drives motor 22 so that its shaft position represents the instantaneous $x$ coordinate value. Wiper 31 on potentiometer 32 is driven by shaft 33 to a position which will provide a bucking voltage to the converted radar input data in electrical differential 19 causing shaft 30 of motor 22 to follow the input data in the manner previously described in connection with the first slewing period.

When timing switch 21 moves to position 4, the second integrating period begins. Motor 23 connects with the output from servo amplifier 20, clutch 28 and brake 26 are energized and clutch 25 is deenergized. Thus a new $x_3$ value is locked in shaft 33 and potentiometer 32. Shaft 39 of motor 23 is driven as in the first integrating period to provide an output to differential 34 of $$\frac{1}{T_I}\int_{t_3}^{t_5}(x-x_3)dt$$

This value is added to the $x_3$ value already inserted in differential 34 to provide a shaft output position representing $x_4$ according to Equation 21, a coordinate of point $P_4$ shown in FIGURE 1. Since input shaft 41 is directly connected to output shaft 36 of differential 34, the value of $x_4$ is fed into differential 37 and compared with the value of $x_1$ appearing at the other input shaft 40 to rotate output shaft 42 to a position representing the value $x_4-x_1$.

Following the second four second integration period, timing switch automatically moves to position 5 to begin the mode two operation, energizing brakes 43 and 29 and disconnecting both servo motors 22 and 23 from the output of amplifier 20. Brake 26 remains energized. Shafts 40 and 42 are thereby locked in position representing $x_1$ and $x_4-x_1$ values which are operated on as hereinafter described to provide the $x$ and $y$ coordinates of mortar 10.

The $y$ channel operates on the $y$ coordinate values of the converted radar input data to provide $y_1$ and $y_4-y_1$ shaft positions for use in the mode two operation in an identical manner to that just described for the $x$ channel.

While similar in operation, the $h$ channel varies in some details from the $x$ and $y$ channels. The $h$ coordinate is always positive, since shell 15 cannot be tracked until it emerges from the ground clutter. Therefore no provision need be made to handle both positive and negative $h$ coordinate data from the radar unit. With a horizontal plane through radar unit 12 as the zero $h$ position, potentiometer 44 is adapted to produce a bucking voltage for the positive $h$ values at electrical differential 45 for controlling the operation of servo motor 46 in the same manner as set forth in the description of the $x$ channel. Potentiometer 44 is grounded at one end and excited by a zero phase voltage at its opposite end so that only voltages of zero phase will be fed into differential 45 from wiper 44' of potentiometer 44 to buck the $h$ voltage from the radar unit.

In the $h$ channel it is also necessary to insert the gravity corrections $\frac{1}{24}gT_I^2$ in the integration process and $\frac{1}{2}gT^2$ in the $h_4-h_1$ term. Since the difference of two integration process is used, the $\frac{1}{24}gT_I^2$ terms in Equations 24 and 25 will cancel out in forming the $h_4-h_1$ term. However, it must be added in the $h_1$ value applied to mechanical differential 47. Since $\frac{1}{24}gT_I^2$ is a constant this may be accomplished by an angular offset in the shaft position of the input to the differential. The $\frac{1}{2}gT^2$ term is likewise added to shaft 48 in differential 49 as an angular offset.

Correction for the fact that the mortar location may actually be below the horizontal of the radar is made by means of $h_m$ dial 50. Output shaft 51 from dial 50 is connected to mechanical differential 47 so that its shaft position will be subtracted from the $h_1$ shaft position to provide an output representing $h_1-h_m$ at shaft 52, where $h_1-h_m$ equals the vertical distance between shell 15 at point $P_1$ and mortar 10. $h_m$ is an estimated value inserted manually by operation of dial 50.

In mode two the shaft positions $h_4-h_1+\frac{1}{2}gT^2$, $x_4-x_1$ and $y_4-y_1$ position wipers 53, 54, and 55 of potentiometers 56, 57 and 58 respectively. These potentiometers are taper wound according to the square function in each direction from the grounded center tap, since the input shaft variable may be either positive or negative. However, the square is always positive allowing both ends of the potentiometers to be energized by a voltage of the same phase. The wiper output voltages of potentiometers 56, 57 and 58 are therefore $(h_1-h_4+\tfrac{1}{2}gT^2)^2$, $(x_4-x_1)^2$ and $(y_4-y_1)^2$, respectively. These voltages are added in electrical differential 59 and their sum is balanced against a voltage $(VT)^2$ from square function potentiometer 60. The output of electrical differential 59 is applied through servo amplifier 61 to motor 62, driving wiper 63 of square function potentiometer 60 to the balance position. By Equation 19 the position of shaft 64 is then proportional to VT.

Shaft 64 positions wipers 65 and 66 of potentiometers 67 and 68 to provide both positive and negative voltages proportional to the slow-down corrections $$\frac{1}{T(1-\tfrac{1}{2}KVT)}$$

appearing in Equations 15, 16 and 17. The outputs from wipers 65 and 66 of potentiometers 67 and 68 are used to energize the positive and negative ends of center tapped potentiometers 69, 70 and 71. Wipers 72, 73 and 74 of these potentiometers are positioned by the $h_4-h_1+\tfrac{1}{2}GT^2$, $x_4-x_1$ and $y_4-y_1$ shafts respectively. The wiper outputs therefore are $$\frac{h_4-h_1+\tfrac{1}{2}gT^2}{T(1-\tfrac{1}{2}KVT)}$$

$$\frac{x_4-x_1}{T(1-\tfrac{1}{2}KVT)}$$

and $$\frac{y_4-y_1}{T(1-\tfrac{1}{2}KVT)}$$

which, by Equations 17, 15 and 16 respectively, equal the coordinate velocities $\dot{h}_1$, $\dot{x}_1$ and $\dot{y}_1$.

The $\dot{h}_1$ voltage is applied through isolation amplifier 75 to electrical differential 76 and potentiometer 77 in the $t_m$ circuit. The solution for $t_m$ results from Equation 3 which may be written in the form $$\frac{h_1-h_m}{t_m}=\dot{h}_1+\frac{1}{2}\ddot{h}_1 t_m$$

$t_m$ and $\ddot{h}_1$ being negative. Wiper 78 of potentiometer 77 is positioned by shaft 79 of $t_m$ servo motor 80. The output of potentiometer 77 is therefore $\dot{h}_1 t_m$, which is applied to the VT positioned potentiometer 81, resulting in $\dot{h}_1 t_m VT$.

It is desired to obtain an output of $\tfrac{1}{2}\dot{h}_1 KV t_m$. Since the different terms in these expressions ($\tfrac{1}{2}$, K and T) are constants, this may be done by adjustment of scale factors. The $\tfrac{1}{2}\dot{h}_1 KV t_m$ voltage from wiper 82 of potentiometer 81 is applied to one end of potentiometer 83, which is energized by a voltage representing the gravity term "g" from the secondary 84 of computer transformer 85. Wiper 86 is positioned to $t_m$ by $t_m$ servo motor 80. Effectively this multiplies $t_m$ by $g$ and adds the $\tfrac{1}{2}\dot{h}_1 KV t_m$ voltage from wiper 82 of potentiometer 81. By adjustment of the scale factor a $\tfrac{1}{2}$ term is introduced in the multiplication of $gt_m$ in potentiometer 83. The output from wiper 86 of potentiometer 83 is therefore $\tfrac{1}{2}\dot{h}_1 KV t_m + \tfrac{1}{2}gt_m$, which simplifies to $\tfrac{1}{2}t_m(\dot{h}_1 KV + g)$. By Equation 11 this is $\tfrac{1}{2}\ddot{h}_1 t_m$ which is the second term of the basic equation for the solution of $t_m$ given above and is applied to electrical differential 76.

Potentiometer 87 is positioned to $t_m$ by servo motor 80 and divides a constant voltage to produce an output voltage from wiper 88 representing $$\frac{1}{t_m}$$

This voltage $$\frac{1}{t_m}$$

is applied to potentiometer 89. Wiper 90 of potentiometer 89 is positioned by $h_1-h_m$ shaft 52. The output from wiper 90 is therefore $$\frac{h_1-h_m}{t_m}$$

which is the third term of the basic equation for the solution of $t_m$. This $$\frac{h_1-h_m}{t_m}$$

output is applied to electrical differential 76 and compared with the other two inputs. The difference voltages result in an output from differential 76 which is applied through servo amplifier 91 to motor 80 to drive the $t_m$ potentiometers 77, 83 and 89 to a position which will result in no output from differential 76. When this condition is reached, the position of shaft 79 on motor 80 is proportional to $t_m$.

The solution for $x_m$ is based on Equation 1, $$x_m=x_1+\dot{x}_1 t_m+\tfrac{1}{2}\ddot{x}_1 t_m^2$$

$x_1$, generated as a shaft position in mode one, is inserted in mechanical differential 92. The other two terms necessary to provide a solution for Equation 1 must be obtained as a shaft position for the second input 93 to differential 92 which adds the two shaft positions and produces an output on shaft 94 representing $x_m$. The $\dot{x}_1$ voltage from wiper 73 of potentiometer 70 is applied through isolation amplifier 95 to potentiometers 96 and 97. Wiper 98 of potentiometer 96 is positioned by shaft 79 of $t_m$ servo motor 80 to provide an output voltage $\dot{x}_1 t_m$ which is one of the terms required in Equation 1. This output voltage $\dot{x}_1 t_m$ is applied directly to electrical differential 99. Potentiometer 97 is a square function potentiometer and its wiper 100 is also positioned by shaft 79 of $t_m$ servo motor 80. Therefore, the output from wiper 100 is $\dot{x}_1 t_m^2$. This value is applied to potentiometer 101. Wiper 102 of potentiometer 101 is positioned by VT servo motor 62, and its scale factor adjusted to insert the constants $\tfrac{1}{2}K$ and $1/T$, as was done at potentiometer 81. The output from wiper 102 is therefore $\tfrac{1}{2}\dot{x}_1 KV t_m^2$, which by Equation 9 equals $\tfrac{1}{2}\ddot{x}_1 t_m^2$. This output is added to the $\dot{x}_1 t_m$ voltage in differential 99 and the sum balanced against a voltage from potentiometer 103. The difference voltage is applied through servo amplifier 104 to motor 105, driving motor shaft 93 which positions wiper 106 of potentiometer 103. When the output from wiper 106 balances the other two inputs to electrical differential 99, the position of shaft 93 is proportional to $x_1 t_m + \tfrac{1}{2}x_1 t_m^2$. This input to mechanical differential 92 plus the input proportional to $x_1$ equals $x_m$ by Equation 1.

$x_m$ is the $x$ coordinate of mortar 10 relative to the radar unit 12. To find the mortar location in map coordinates, it is necessary to add the $x$ map coordinate of the radar location to $x_m$. This is done by setting and locking $x_{RO}$, the map coordinate of the radar, into mechanical differential 107 through manual operation of dial 108 and adding $x_m$ from shaft 94. The shaft output from differential 107 is therefore $x_m+x_{RO}$, which drives dial 109 to a position indicating the numerical value of $x_M$, the $x$ coordinate of mortar location in map coordinates.

The mechanization for finding the mortar $y$ coordinates is identical to that just described for the $x$ coordinates.

The clutch-brake units $C_1$, $B_1$, $C_2$, $B_2$, and $C_3$, $B_3$ used in the mode one portion of the computer as shown in FIGURE 4 provide a clutching or braking of the computer shafts within 10 milliseconds. Tubular housing 109 of each clutch-brake unit, as shown in FIGURE 5, supports an annular shaped clutch core and coil assembly 110 adjacent one end thereof and a brake core and coil assembly 111 axially spaced from the clutch coil and core assembly. A hollow shaft 114 is axially received within housing 109 and rotatably supported by clutch core 112 through bearings 115 and 116. A driving gear 117 is rigidly carried by one end of hollow shaft 114 beyond housing 109 and a clutch plate 118 is rigidly carried at the opposite end within the housing so as to be interposed between clutch assembly 110 and brake assembly 111. A second shaft 119 extending axially through hollow shaft 114 carries a disc 120 at its inner end between clutch plate 118 and a fixed plate 121 forming a portion of brake core 113. The spacing between disc 120 and plates 118 and 121 is such that only .005 inch of axial movement of shaft 119 is required for the disc to make frictional contact with either the clutch or brake plates. By rotatably supporting shaft 119 in hollow shaft 114 through bearings 122 and 123 so as to allow limited axial movement thereof relative to shaft 114, its rotational movement may be positively controlled by energizing the coil in assembly 110 or 111. When the coil in assembly 110 is energized, it sets up a magnetic field causing disc 120 to move into contact with clutch plate 118 so that shaft 114 rotates with shaft 114. When the coil in assembly 111 is energized, disc 120 is caused to move into contact with fixed plate 121 and prevent rotation of shaft 119 irrespective of the rotational movement of shaft 114. De-energizing the coils in both assemblies permits the two shafts 114 and 119 to rotate independently of one another. Driven gear 124 rigidly connecting with shaft 119 forwardly of driving gear 117 controls the movement of shafts such as 33 in FIGURE 4 as hereinbefore described and driven gear 117 connects with shafts such as 30 from motor 22 for operation as is also hereinbefore described.

FIGURE 6 shows the detail construction of the reset spring unit $R_1$ employed in the integrating circuits of the computer described in connection with FIGURE 4. Reset spring 125 is contained in a cylindrical housing 126 rigidly supported by the computer chassis 127. Shaft 128, which in the $x$ channel of FIGURE 4 is the same as shaft 39', extends axially through housing 126 and spring 125 and is adapted for rotation relative thereto. A pair of spring supporting members 129 and 130 are axially received by shaft 128 within housing 126 for independent rotation relative to the shaft. Pins 131 on members 129 and 130 are adapted to engage pins 132 on housing 126 whereby to provide stops for limiting the rotational movement of the members. A lug 133 rigid with shaft 128 extends radially thereof to engage axially protruding abutments 134 and 135 on members 129 and 130. One end of spring 125 connects with member 129 and the other end connects with member 130 which is adapted to rotate from its stop in an opposite direction from that of member 129 so that spring 125 may be wound up by rotation of either member.

When shaft 125 rotates in either direction from its zero position, which is when members 129 and 130 are positioned against the stops, lug 133 causes one of the members to rotate with it by contacting the abutment of that member so as to wind up the spring. Thus when the shaft is released, spring 125 returns it to the zero position. The preload in the spring is sufficient to overcome the frictional forces in other components tending to rotate the shaft.

The operation of the computer in the over-all system as schematically illustrated in FIGURE 1 is believed obvious from a reading of the foregoing description. Radar unit 12 and computer 11 are set up in the field at a location which will permit radar tracking of enemy mortar shells. When the enemy mortar 10 fires a shell 15, the radar beam from scanner 14 acquires that shell at point A on its trajectory 16 and continues to follow the shell by movement of the scanner. The radar generates polar coordinate data representing the instantaneous angular position of the scanner and the range of the target. This polar coordinate data is converted into rectangular coordinate data in axis converter 13 for use by computer 11 as hereinbefore described. Points $P_1$ and $P_4$ on the shell trajectory are memorized in the computer, where $P_1$ and $P_4$ are 6 seconds apart in point of time designated as T in the equations, and $P_1$ is four and one-half seconds away from point A. From a knowledge of the surrounding terrain, an estimate of the difference in altitude between mortar 10 and radar 12 is made and inserted in the computer manually by means of $h_m$ dial 50. Also, since location of the enemy mortar may be desired in map coordinates, the $x$ and $y$ coordinate values of the radar position relative to a known reference point on a map are inserted in the computer by means of dials 108. The computer automatically operates on this data to produce $x$ and $y$ coordinate values of mortar 10 in map coordinates.

Though the computer is described herein as a mortar locating computer it may be used with equal facility for other purposes, such as the determination of the impact location of shells by simply reversing the phase of certain voltages in the $t_m$ circuit.

It is to be understood that certain changes, alterations, modifications and substitutions can be made without departing from the spirit and scope of the appended claims.

We claim as our invention:

1. A mortar locating computer adapted to operate on coordinate output data generated by radar tracking of a mortar shell along its trajectory to produce coordinate information representing relative mortar position comprising, $x$, $y$ and $h$ channels adapted to receive $x$, $y$ and $h$ coordinate voltages generated by said radar, each said channel having an electrical differential for receiving said radar output data, a pair of servo motors, and a potentiometer controlled by one of said motors, the output of said potentiometer being inserted in said electrical differential to produce an output therefrom representing the difference between said radar output data and said potentiometer output, a timing switch adapted to alternately connect said motors with the output from said electrical differential in accordance with a predetermined timing sequence whereby said one motor produces a shaft position representing instantaneous coordinate positions and said other motor produces a shaft position representing a summation of the difference between said radar output data and the instantaneous coordinate position at the start of operation of said other motor, a mechanical differential connecting with said shafts for adding said instantaneous coordinate position and said summation to produce an output shaft position representing a coordinate of a point on the shell trajectory, said timing switch being adapted to similarly cause said motors to generate a new shaft position representing a coordinate of a second point on said trajectory spaced from said first point by a predetermined time interval, a mechanical differential connecting with the output from said first mentioned mechanical differential producing an output shaft rotation proportional to the coordinate difference between said points, a square function potentiometer and a velocity potentiometer connecting with said shaft output from said last mentioned mechanical differential, means including an electrical differential receiving the outputs from said square function potentiometers of all of said channels producing a drag correction voltage proportional to the resultant velocity of said shell, said voltage being applied to said velocity potentiometer of each said channels to produce a voltage representing the coordinate velocity of said shell at said first mentioned point, means responsive to said $h$ velocity coordinate and said $h$ position coordinate at said first mentioned point producing a shaft rotation to a position representing the time required for said shell to reach said first mentioned point from said mortar, means responsive to said last mentioned shaft position, to said drag correction means and to outputs from said $x$ and $y$ channel velocity potentiometers for producing voltages proportional to $x$ and $y$ coordinate accelerations at said first mentioned point, means including a servo motor responsive to said velocity potentiometers and said acceleration voltages generating a shaft position representing the sum of the coordinate distances due to the coordinate velocity and acceleration of said shell at said first mentioned point, and differentials controlled by said last mentioned shaft positions and said first mentioned mechanical differentials having outputs representing coordinates of position of said mortar relative to said radar.

2. An electro mechanical computer for locating artillery positions responsive to coordinate position input data appearing in the form of a voltage generated by radar tracking of shells comprising, an electrical differential adapted to receive said input data, means including a motor responsive to the output from said differential producing a shaft rotation, a potentiometer controlled by said shaft and having an output voltage feeding into said differential tending to balance said input data whereby said shaft position is maintained proportional to said data, a second motor responsive to the output from said differential producing a shaft rotation, the speed of which is proportional to the output from said differential and the position of which represents the total output therefrom during the period of operation of said second motor, a timing switch adapted to cause said motors to operate sequentially, a mechanical differential controlled by said shafts, the shaft output of which is a combination of said shaft positions representing a coordinate of a point on the trajectory of the shell being tracked, said timing switch being adapted to cause said motors to similarly generate a coordinate of a second point on said trajectory spaced from said first point by a predetermined time interval, means for memorizing said coordinates of said points including a differential adapted to produce the difference between said coordinates, means responsive to said last mentioned differential generating an output proportional to the coordinate velocity of said shell at said first mentioned point on said trajectory, means generating a second coordinate of position and velocity of said shell at said first mentioned point, means responsive to said last mentioned means generating an output representing the time required for said shell to reach said first mentioned point from the firing position, means responsive to said last mentioned means and said first mentioned velocity producing means generating an output proportional to the coordinate acceleration of said shell at said first mentioned point, and means including a differential responsive to said coordinate position, velocity and acceleration outputs producing a coordinate of the position from which said shell was fired relative to said radar.

3. An electro-mechanical computer responsive to outputs from a shell tracking radar generating coordinate positions of said shell along its trajectory comprising, integration smoothing means for receiving said outputs and generating voltages representing shell positions at spaced time intervals, means responsive to said first mentioned means generating an output proportional to the velocity of said shell, means responsive to said first mentioned means and said second mentioned means generating an output representing the elapsed time required for said shell to reach said shell positions along its trajectory from the firing position, and means responsive to said first, second and third mentioned means for generating coordinate positions representing the location from which said shell was fired relative to said radar.

4. An electro-mechanical device for remembering and smoothing radar tracking data comprising, an electrical differential adapted to receive said data, in the form of a voltage, means including a motor responsive to the output from said differential producing a shaft rotation, a potentiometer controlled by said shaft and having an output voltage feeding into said differential tending to balance said data voltage whereby said shaft position is maintained proportional to said data, a second motor responsive to the output from said differential producing a shaft rotation, the speed of which is proportional to the output from said differential and the position of which represents the total output therefrom during the period of operation of said second motor, a timing switch adapted to operate said motors sequentially, and a mechanical differential controlled by said shafts, the output of which is a combination of said shaft positions representing a coordinate point on the trajectory of the object being tracked.

5. An electro-mechanical computer responsive to outputs from a shell tracking radar comprising, means responsive to said outputs generating position coordinates of said shell at points on its trajectory, timing means connecting with said first mentioned means and controlling the spacing between said points so as to correspond to a predetermined time interval, differentials responsive to said first mentioned means producing outputs representing the change in said position coordinates between said points, means responsive to the outputs from said differentials producing a drag correction output proportional to said predetermined time interval, means responsive to said differentials and said last mentioned means producing outputs proportional to the velocity of said shell, means responsive to said first and fourth mentioned means generating an output representing the elapsed time required for said shell to travel from its initial firing position to said first point on said trajectory, means responsive to said third, fourth and fifth mentioned means generating an output proportional to the acceleration of said shell, and means responsive to said first, fourth and last mentioned means generating coordinates of position representing the location from which said shell was fired relative to said radar.

6. An electro-mechanical computer adapted to operate on input data generated by radar tracking of a projectile to produce coordinate information representing the relative position of one end of its trajectory comprising, integration smoothing means responsive to said input data generating outputs representing points on said trajectory spaced apart by a predetermined time interval, means responsive to said means generating an output proportional to the velocity of said projectile, means responsive to said last mentioned means generating an output proportional to the acceleration of said projectile, and means responsive to said first, second and third mentioned means generating position coordinates representing the location of one end of said trajectory relative to said radar.

7. An electro-mechanical device for automatically smoothing position data generated by radar tracking of a projectile along its trajectory comprising, differential means for receiving said radar data, a pair of servo motors, a timing switch interposed between said differential means and said motors adapted to alternately connect said motors to said means in accordance with a predetermined sequence, a potentiometer, the output of which is controlled by one of said motors, said output being fed into said differential means and compared with said position data whereby the output from said one motor is proportional to said position data, the other said motor being driven by the output from said differential means, the output from said other motor representing an integration of the change in position data over a predetermined length of time, and a second differential controlled by said outputs from said motors and having an output representing the location of a point on the actual trajectory.

8. An electro-mechanical computer adapted to operate on input data generated by radar tracking of a projectile to produce coordinate information representing the relative position of one end of its trajectory comprising, differential means for receiving said radar data, a pair of servo motors, a timing switch interposed between said differential means and said motors adapted to alternately connect said motors to said means in accordance with a predetermined sequence, a potentiometer, the output of which is controlled by one of said motors, said output being fed into said differential means and compared with said position data whereby the output from said one motor is proportional to said position data, the other said motor being driven by the output from said differential means, the output from said other motor representing an integration of the change in position data over a predetermined length of time, a second differential controlled by said outputs from said motors and having an output representing a coordinate of a point on said trajectory, means responsive to said differential having an output proportional to the coordinate velocity of said projectile at said point, means responsive to said last mentioned means generating an output proportional to the coordinate acceleration of said projective at said point, and means including a differential responsive to said second differential and said velocity and acceleration outputs generating a position coordinate representing the location of one end of said trajectory relative to said radar.

9. An electro-mechanical computer adapted to operate on input data generated by radar tracking of a projectile to produce coordinate information representing the relative position of one end of its trajectory comprising, integration smoothing means responsive to said radar input data generating position coordinates of said projectile, means responsive to said smoothing means generating coordinate outputs proportional to the velocity of said projectile, means responsive to said last mentioned means generating coordinate outputs proportional to the acceleration of said projectile, and means including a differential responsive to said first, second and third mentioned means generating coordinates of position representing the location of one end of said trajectory relative to said radar.

References Cited in the file of this patent

UNITED STATES PATENTS

| | | |
|---|---|---|
| 2,404,011 | White | July 16, 1946 |
| 2,409,462 | Zworykin | Oct. 15, 1946 |
| 2,442,383 | Stewart | June 1, 1948 |
| 2,463,233 | Alexanderson | Mar. 1, 1949 |
| 2,557,949 | De Loraine | June 26, 1951 |
| 2,578,299 | Harrison | Dec. 11, 1951 |